UNITED STATES PATENT OFFICE.

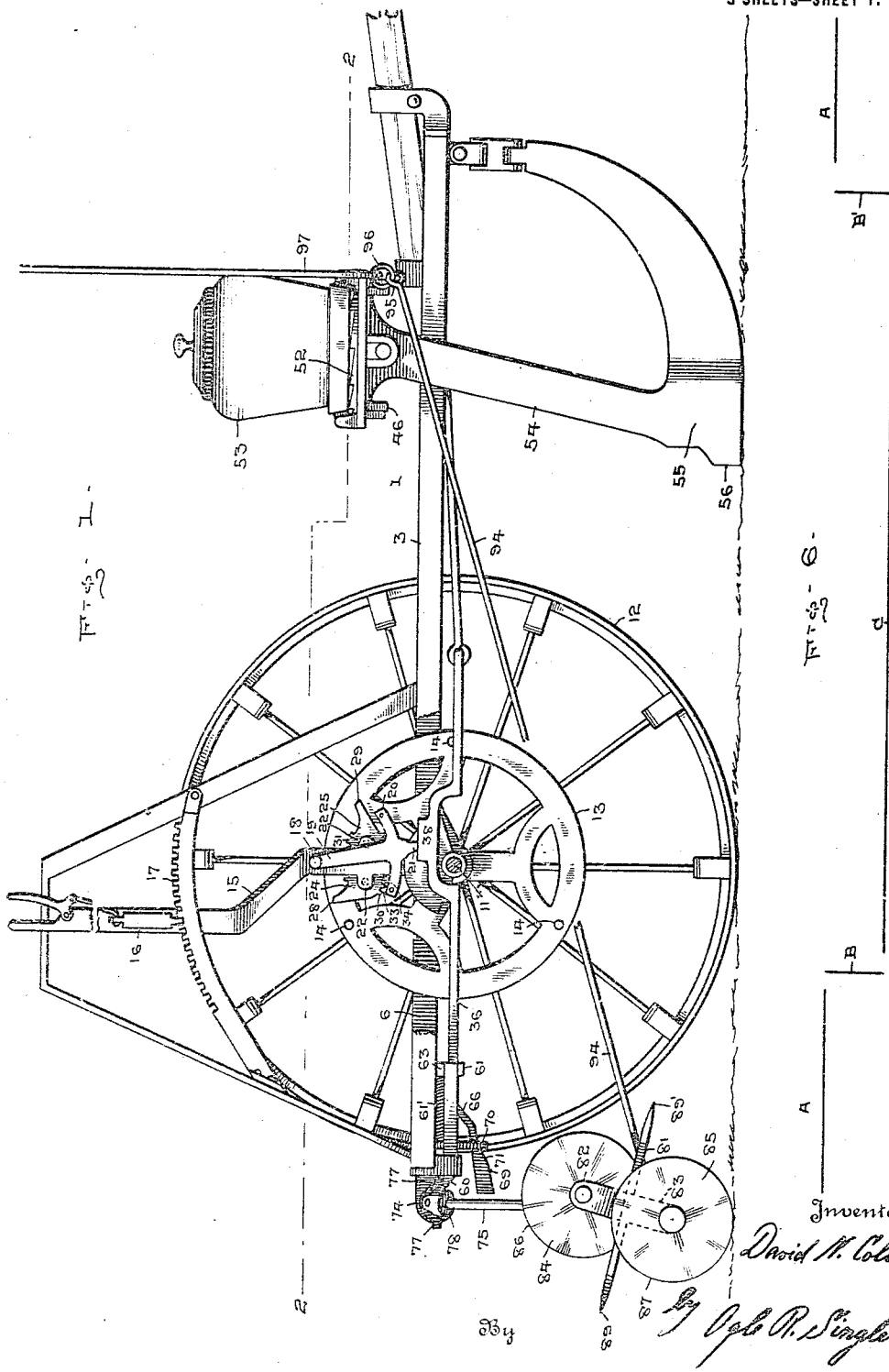

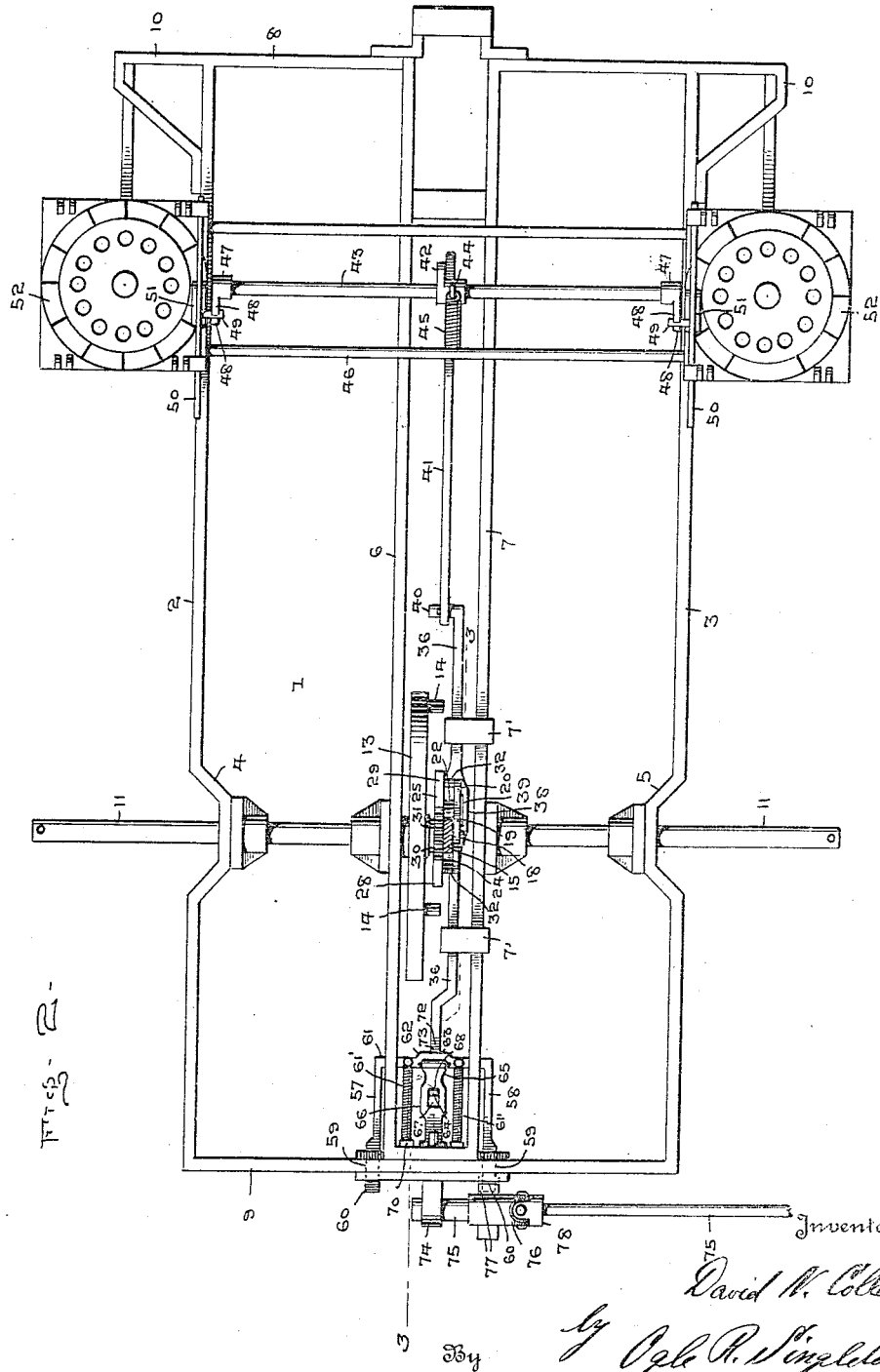

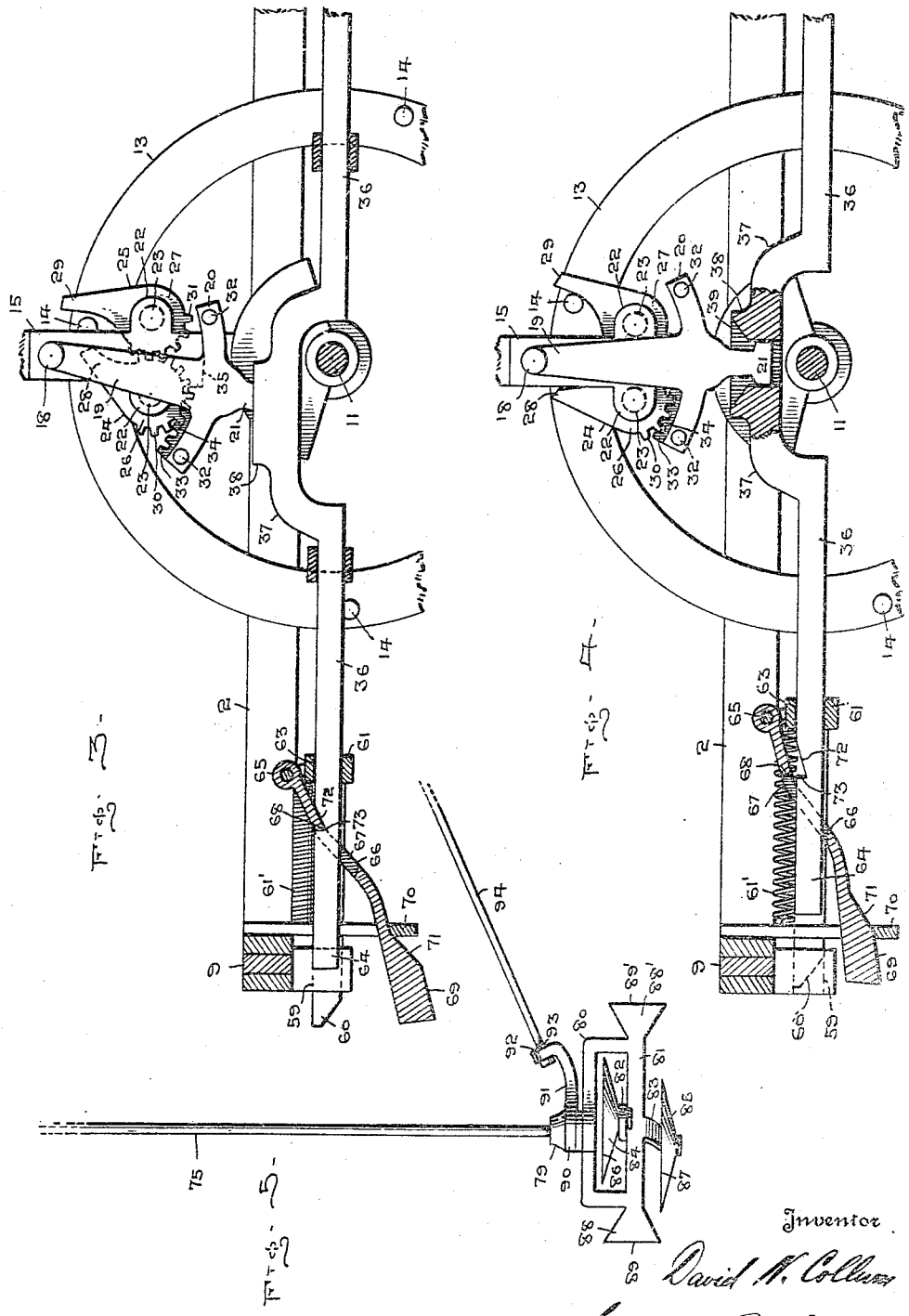

DAVID N. COLLUM, OF BLOOMINGTON, ILLINOIS.

CORN-PLANTER.

1,244,957.  Specification of Letters Patent.  Patented Oct. 30, 1917.

Application filed October 12, 1916. Serial No. 125,213.

*To all whom it may concern:*

Be it known that I, DAVID N. COLLUM, citizen of the United States, residing at Bloomington, in the county of McLean and State of Illinois, have invented certain new and useful Improvements in Corn-Planters, of which the following is a specification.

My invention relates to a new and useful improvement in corn planters. It provides a device which is a "wireless" planter, adapted for "check row" planting. The novel features of my device comprise means for dropping the corn at certain predetermined intervals and means for marking both the distinct guiding line for the direction of the planter and also the "hill" marks where the corn is to be dropped. These two means are operated in my device by the same mechanism in such a way that the two operations are synchronized, thus insuring regular alinement of the "check rows." My device also includes means for so adjusting the planting and marking means, as to regulate the occurrence of the operation of these means to correct any variations in location, which may have resulted in the travel of the corn planter.

The invention consists in the details of construction hereinafter pointed out.

In the annexed drawings:

Figure 1 is a side view of a corn planter provided with my invention.

Fig. 2 is a plan view on the line 2—2, of Fig. 1, of a portion of a corn planter provided with the invention.

Fig. 3 is an enlarged detail view, on the line 3—3 of Fig. 2, of a portion of the device, showing an adjustment of the parts, in the course of their operation.

Fig. 4 is a similar view to Fig. 3, showing similar parts in a different adjustment.

Fig. 5 is a plan view of the marker means.

Fig. 6 is a diagrammatic view of the marks made by the device.

In these drawings:

The numeral 1 designates the frame of the corn planter having the longitudinal side bars 2 and 3 with inward bends 4 and 5 opposite each other, longitudinal middle bars 6 and 7 spaced apart, and, fastened to these bars 6 and 7, front and rear end bars 8 and 9. The front bar 8 is provided with the projecting ends 10. Held in suitable bearings in the longitudinal bars 4, 5, 6 and 7 across the corn planter in line with the bends 4 and 5 is the axle 11. On this axle 11 are placed the wheels 12 of the corn planter, one of which is seen in Fig. 1. Secured to the axle 11 between the middle bars 6 and 7 is the wheel 13, provided with three pins 14, located at equi-distant points upon the periphery of the wheel 13 and projecting at right angles thereto. Loosely mounted upon the axle 11, between the wheel 13 and the longitudinal side bar 7, is the adjusting lever 15, provided with the latch 16 operating in the rack 17. The lever 15 is provided with the stud 18 upon which is loosely hung the frame 19, having the segmental cross-arm 20 and the finger 21. Between the stud 18 and the axle 11, the lever 15 is provided with the two laterally extending ears 22, 22, which are provided with the studs 23, 23, upon which are mounted two tappets, 24 and 25, respectively, having the circular portions 26 and 27, which are provided with the fingers 28 and 29, and the toothed portions 30 and 31 which are adapted to inter-mesh. The fingers 28 and 29 are so located as to be alternatively in the path of travel of the pins 14 upon the wheel 13. The segmental cross-arm 20 is provided at its ends with the studs 32, 32, to which is attached the segmental plate 33, located upon the side of the lever 15 opposite to the frame 19 and in line vertically with the tappets 24 and 25. The segmental plate 33 is provided on its upper face with a toothed portion 34 through half its length and the smooth portion 35 through the remainder of its length. The toothed portion 34 is adapted to inter-mesh with the toothed portion 30 of the tappet 24. The operating rod 36 is located between the adjusting lever 15 and the longitudinal middle bar 7, carried in the frames 7′, 7′. The rod 36 is provided with the shoulders 37, 37 supporting the enlarged portion 38 with passes above the axle 11 and is provided with the slot 39 adapted to receive the lower end of the finger 21. The rod 36 is provided with the shoulder 40, at its front end, to which is attached the rod 41 having its front end attached to the rock-arm 42, mounted upon the rock-shaft 43 and provided with upwardly extending hook 44 to which is attached the spring 45 fastened to the cross-bar 46 connecting the longitudinal side bars 2 and 3. The rock-shaft 43 is provided at each of its ends with a collar 47 provided with the jaws 48, 48, adapted to receive the pin 49 attached to the slide 50 which has the depending dog 51 adapted to operate the ratchet-plate 52 for feeding the corn from the bottom of the box 53. Leading from beneath the plate 52 is the chute 54 connected with the shoe 55 which has the planting door 56.

Adjacent the rear ends of the longitudinal middle bars 6 and 7 are the rods 57 and 58 which pass through the apertures 59, 59 in the rear end bar 9 and terminate in the projections 60, 60. These bars 57, 58 are connected, at their opposite ends, by the rod 61. Helical springs 61', 61' connect the rod 61 with the rear end bar 9. The bar 61 is provided with the enlarged middle portion 62 which has through its center the aperture 63 adapted to receive therethrough the rear end 64 of the operating rod 36. Hingedly connected to the top of the enlarged portion 62, is the rearwardly depending latch 65, provided with the enlarged middle portion 66, having therein the aperture 67 forming the lip 68 and adapted to receive therethrough the rear end 64 of the operating rod 36. The latch 65 is further provided with the rear end weighted portion 69 which is carried in the depending yoke 70 which is attached to the rear end bar 9. This weighted portion 69 has the beveled face 71 bearing against the inner face of the yoke 70. The rear end 64 of the operating rod 36 is provided with the notch 72 forming the lip 73.

Attached to the rear face of the rear end bar 9 and at its middle, is the revoluble loop 74, having journaled therein the marker rod 75 which is provided with the collar 76 having two diametrically opposed projections 77, 77, adapted to contact alternatively with the projections 60, 60. Adjacent the collar 76, the rod 75 is provided with the universal joint 78 and at its outer end the rod 75 is provided with the marker head 79 which has the frame 80 with the transverse bar 81. From the inner edge of this bar 81 extends at right angles thereto the projection 82, while from the outer edge of the bar 81 extends at right angles thereto the projection 83, disposed in the direction opposite to the direction of the projection 82. Journaled in the outer ends of these projections 82 and 83 are the marker disks 84 and 85, provided with the knife-edged peripheries 86 and 87, respectively. The rod 81 is provided at one end with the fan-shaped plate 88 having the knife-edge 89, and at its opposite end with the fan-shaped plate 88' having the knife-edge 89'. These knife edges 89 and 89' are parallelly located at right angles to the parallelly disposed knife-edged peripheries 86 and 87. Adjacent the inner end of the marker head 79 is loosely mounted the collar 90 having the curved projection 91 with the collar 92 adapted to receive the end 93 of the stay rod 94 which is provided at its opposite end with the loop 95 holding the ring 96 which is attached to the guide frame 97 fastened to the longitudinal side bar 2 and 3.

Operation: The parts are in the position shown in Fig. 1. In this position, the planter is represented in location to begin the operation of dropping corn in one row, and the marking of the line for the next row and the position of the "hills" to be planted in that row. The marker rod 75 is extended on the right side of the corn planter, with one of the projections 77 resting upon the projection 60. The marker head 79 is in operative position with the disk 85 having its periphery 87 in contact with the ground. As the corn planter is drawn forward, the traction wheels 12 revolve the axle 11 carrying with it the wheel 13, thus bringing a pin 14 into contact with the finger 28 of the tappet 24, carrying the finger 28 forward, thus revolving the tappet 24 which through the toothed portions 30 and 31 causes the tappet 25 to revolve, lifting the finger 29, and also through the toothed portions 30 and 34 causes the segmental plate 33 to move rearwardly, carrying with it through the studs 32 and the segmental cross-arm 20 the finger 21, which by its movement slides the operating rod 36. This movement of the rod 36 causes the notched portion 72 to pass under the latch 65 and permits the lip 73 to contact with the lip 68, when the latch 65 rests in the notch 72.

As the operating rod 36 reaches the limit of its rearward movement, through the rod 41, parts [not shown] operate in any well known manner to open the feed doors 56 and drop the corn for planting the "hills".

The pin 14 passes off of the finger 28, contacts with the finger 29 which has been elevated into the path of the pin 14, and moves the finger 29 forward, thus revolving the tappet 25 which through the toothed portions 31 and 30 causes the tappet 24 to revolve, thus restoring the tappet 24 and its finger 28 to normal position, which movement through the toothed portions 30 and 34 causes the segmental plate 33 to move forward and through the studs 32 and segmental cross-arm 20 carries the finger 21 forward thus moving the operating rod 36 forwardly. This forward movement of the rod 36 through the contacting lips 73 and 68 carries with the rod 36 through the latch 65 the cross rod 61 and the attached rods 57 and 58, thus withdrawing the projections 60 within the apertures 59. The withdrawal of the projections 60 releases the projection 77, lately in contact with the projection 60, releasing the marker rod 75 and its marker head 79 which are rotated by the pressure of the contact of the disk 85 with the ground. The rotation of the marker head 79 carries the projection 83 out of the substantially perpendicular position to the substantially horizontal position and the rod 81 from the substantially horizontal position to the substantially perpendicular position, thus raising the disk 85 from contact with the ground and bringing the knife edge 89′ into momentary contact with the ground, which contact causes the marker further to revolve, thus reversing the relative positions of the rod 81 and the projection 82 and carrying the knife edge 89′ out of contact with the ground and the disk 84 into contact with the ground. When these operations have been completed, the second projection 77 has reached the position formerly occupied by the first projection 77 and before the completion of these operations the forward movement of the latch 65 has been sufficient to lift the latch 65 through inter-action of the weighted portion 69, its beveled face 71 and the yoke 70, so that the lip 68 is disengaged from the lip 73 and the springs 61′, 61′, return the rods 61, 57 and 58 to their normal positions, thus extending the projections 60 from without the apertures 59, so that the projection 77 contacts with the projection 60. The change of parts accomplished in the revolution through 180 degrees of the marker head 79 results in the breaking of the guide mark made by the periphery 87 [indicated by "C" in Fig. 6], the distinct "hill mark" made by the momentary contact of the knife edge 89′ [indicated by "B′" in Fig. 6] and the guide mark made by the periphery 86 [indicated by "A" in Fig. 6].

The forward movement of the rod 36, through the rod 41, rock arm 42, rock shaft 43, collars 47, jaws 48, pins 49, slides 50, dogs 51 and ratchet-plates 52, supplies a new charge of corn, through the chutes 54 and the shoes 55 to the planting doors 56. The spring 45, through the hook 44, assists the operation of the rock shaft and its connecting parts.

The stay-rod 94 serves to brace the marker rod 75 in operative position and is adapted to move from one side of the planter to the other on the guide frame 96 as the marker rod is extended first on one side and then on the other. This change in the position of the marker rod 75 is made possible by the use of the loop 74 and the duplication of the projections 60 to serve alternatively on each side. The universal joint 78 is provided in the marker rod 75 in order to take care of any inequalities in the ground over which the marker head 79 passes.

It is apparent from the foregoing description of the operation of the device that the process of the planting the "hills" and making the "hill marks" is automatically regulated by the travel of the pins 14 controlled by the traction wheel 12, which measure the distance between the "hills". As it frequently happens that inequalities in the ground over which the planter travels tend to vary this measurement, I have provided a means for adjusting my device to correct possible variations. This adjustment is accomplished through the variation of the adjustment lever 15. Should the operator observe that the device will operate before the proper point is reached, he may move the adjusting lever 15 forward, thus retarding the operation of the parts by increasing the distance through which the pin 14 must travel before actuating the mechanism. On the contrary if the operator discovers that the device will reach the point at which the planting and marking should be done before the device is in position to operate, he may accelerate the operation by moving the adjusting lever 15 rearwardly, thus reducing the distance through which the pin 14 must travel to actuate the mechanism.

It will be seen, therefore, that by the use of this adjusting lever 15 the time of the operation of the planting and marking means may be controlled by the operator so as to insure proper "check rowing".

Having described my invention, what I claim is:

1. The combination in a corn planter of means for dropping corn; means for marking the line of travel of the corn planter; means for marking the place where corn is to be dropped; a single means for controlling the operation of the dropping means and the place marking means; and means constantly adjustable during the operation of the controlling means for adjusting the controlling means to vary the time of operation of the dropping means and the place marking means.

2. The combination in a corn planter of means for dropping corn; means for marking the line of travel of the corn planter; means for marking the place where corn is to be dropped; means comprising a single rod adapted to control the dropping means and control the place marking means; and means for adjusting said rod to vary the time of controlling the dropping means and the place marking means.

3. The combination in a corn planter of a single marker means, comprising a head provided with two disks adapted to contact with the ground, alternatively, to make a distinct guiding mark when the head is held against rotation during the travel of the corn planter, and two knife edges adapted to contact with the ground to mark the place where corn is to be dropped, when the head is allowed to rotate; releasing means for allowing the head to rotate intermittently to vary the marking line and to indicate the place for dropping corn; means for dropping corn; a single means adapted to operate the releasing means and the dropping means; and means for adjusting the operating means to vary the time of operation of the dropping and releasing means.

4. The combination in a corn planter of a single rotatable marker rod, having a head provided with two disks disposed in parallel planes journaled at equal distances from the center of the head on opposite sides of a diameter, and further provided with a rod carrying upon each of its two ends a knife edge disposed at right angles to the lines of the peripheries of the parallelly disposed disks, said marker rod being rotatably mounted upon the frame of the corn planter and adapted to be extended on either side of it; means for holding the marker rod in position and intermittently releasing it so that it may rotate; means for dropping corn; a single means adapted to operate the holding and releasing means and the dropping means; and means for adjusting the operating means to vary the time of operation of the dropping and the holding and releasing means.

5. The combination in a corn planter of means for dropping corn; means for marking the line of travel of the corn planter; means for marking the place where corn is to be dropped; an axle; a wheel secured to the axle; pins mounted upon the periphery of the wheel; an oscillating frame loosely mounted upon the axle adjacent to the wheel and provided with two tappets having fingers adapted to extend, alternatively, in the path of travel of the pins; a plate adapted to be moved to and fro by the action of the tappets; a finger connected with the plate; a rod provided with a slot adapted to receive the finger, said rod being actuated by the movement of the plate and its connected finger and operating the dropping means and the place marking means of the corn planter; and an adjusting lever connected to the oscillating frame and adapted to control the frame to vary the time of the operation of the tappets by the pins.

In testimony whereof I affix my signature in the presence of two witnesses.

DAVID N. COLLUM.

Witnesses:
GEO. HATJENBUHLER,
H. B. CAMPBELL.